US011954744B2

United States Patent
Hirata et al.

(10) Patent No.: US 11,954,744 B2
(45) Date of Patent: Apr. 9, 2024

(54) ELECTRIC POWER MANAGEMENT STATION

(71) Applicant: Mitsubishi Electric Corporation, Tokyo (JP)

(72) Inventors: Yosuke Hirata, Tokyo (JP); Yuta Okumura, Tokyo (JP); Yoshito Nishita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 426 days.

(21) Appl. No.: 17/429,383

(22) PCT Filed: Mar. 31, 2020

(86) PCT No.: PCT/JP2020/014855
§ 371 (c)(1),
(2) Date: Aug. 9, 2021

(87) PCT Pub. No.: WO2020/209142
PCT Pub. Date: Oct. 15, 2020

(65) Prior Publication Data
US 2022/0129998 A1   Apr. 28, 2022

(30) Foreign Application Priority Data
Apr. 10, 2019   (JP) .............................. 2019-074539

(51) Int. Cl.
*G06Q 50/06*   (2012.01)
*G06Q 30/0202*   (2023.01)
*H02J 3/00*   (2006.01)

(52) U.S. Cl.
CPC ......... *G06Q 50/06* (2013.01); *G06Q 30/0202* (2013.01); *H02J 3/003* (2020.01); *H02J 3/004* (2020.01); *H02J 2203/20* (2020.01)

(58) Field of Classification Search
None
See application file for complete search history.

(56) References Cited

U.S. PATENT DOCUMENTS

2016/0033949 A1\* 2/2016 Noda .................... G06Q 50/06
700/291

FOREIGN PATENT DOCUMENTS

| CN | 108416690 A | 8/2018 |
|---|---|---|
| JP | 2002262458 A | 9/2002 |

(Continued)

OTHER PUBLICATIONS

Communication pursuant to Article 94(3) EPC dated Jun. 19, 2023, issued in the corresponding European Patent Application No. 20787623. 6, 7 pages.

(Continued)

*Primary Examiner* — Mohammad Ali
*Assistant Examiner* — Joshua T Sanders
(74) *Attorney, Agent, or Firm* — BUCHANAN INGERSOLL & ROONEY PC

(57) ABSTRACT

The actual performance information classify part derives a classification result of an actual performance information on electric power demand, by a classification setting information, from an environment information and a date attribute information which is correlated with each of the electric power demands which is included in an actual performance information on electric power demand. The prediction information calculate part derives a classification result of a prediction target day, using the date attribute information of the prediction target day, which is a day to conduct a prediction, and the environment information which is measured before a start of the prediction of a prediction target day, and in addition, predicts an electric power demand of a prediction target day, based on the electric power demand of (Continued)

the actual performance information on electric power demand, which corresponds to the classification result of the prediction target day.

17 Claims, 10 Drawing Sheets

(56) References Cited

FOREIGN PATENT DOCUMENTS

| JP | 2013196037 A | * | 9/2013 |
|----|--------------|---|--------|
| JP | 2014192910 A |   | 10/2014 |
| JP | 2017153259 A | * | 8/2017 |
| JP | 2017153259 A |   | 8/2017 |
| JP | 2017220050 A | * | 12/2017 |
| JP | 2017220050 A |   | 12/2017 |

OTHER PUBLICATIONS

Notice of Reasons for Refusal issued in Chinese Application No. 202080024341.6; dated May 26, 2023. 21 Pages (with Translation).
Extended European Search Report dated May 6, 2022, issued in corresponding European Patent Application No. 20787623.6, 6 pages.
International Search Report (PCT/ISA/210) with translation and Written Opinion (PCT/ISA/237) dated Jun. 9, 2020, by the Japan Patent Office as the International Searching Authority for International Application No. PCT/JP2020/014855. (9 pages).
Decision of Refusal dated Nov. 28, 2023, issued in the corresponding Chinese Patent Application No. 202080024341.6, 19 pages including 14 pages of English Translation.

* cited by examiner

FIG.2

| DATE ATTRIBUTE CATEGORY / ENVIRONMENT CATEGORY | WEEK DAY | HOLIDAY |
|---|---|---|
| NOT LESS THAN 20° C | PATTERN 1 | PATTERN 2 |
| LESS THAN 20° C | PATTERN 3 | PATTERN 4 |

FIG.3

| DATE | DATE ATTRIBUTE CATEGORY | TEMPERATURE [°C] | HUMIDITY [%] | 6:00-7:00 [kWh] | ... | 17:00-18:00 [kWh] |
|---|---|---|---|---|---|---|
| 20170101 | WEEK DAY | 23 | 80 | 12.7 | ... | 17.5 |
| 20170102 | HOLIDAY | 19 | 71 | 13.8 | ... | 16.4 |
| ⋮ | ⋮ | ⋮ | ⋮ | ⋮ | ⋮ | ⋮ |
| 20171231 | WEEK DAY | 17 | 65 | 14.7 | ... | 18.3 |

FIG.7

| DATE | DATE ATTRIBUTE CATEGORY | TEMPERATURE [° C] | HUMIDITY [%] | 6:00-7:00 [kWh] | ... | 17:00-18:00 [kWh] |
|---|---|---|---|---|---|---|
| 20180101 | HOLIDAY | 12 | 70 | 9.2 | ... | 18.9 |
| 20180102 | HOLIDAY | 12 | 34 | 11.1 | ... | 17.5 |
| ⋮ | ⋮ | ⋮ | ⋮ | ⋮ | ⋮ | ⋮ |
| 20181231 | WEEK DAY | 14 | 56 | 15.6 | ... | 19.1 |

FIG.10

| DATE ATTRIBUTE CATEGORY / HUMIDITY | WEEK DAY | HOLIDAY |
|---|---|---|
| NOT LESS THAN 50% | PATTERN 1 | PATTERN 2 |
| LESS THAN 50% | PATTERN 3 | PATTERN 4 |

ELECTRIC POWER MANAGEMENT STATION

FIELD OF THE INVENTION

The present disclosure relates to an electric power management station which is equipped with a function to predict an electric power demand.

BACKGROUND OF THE INVENTION

When predictions are conducted on an electric power demand in an EMS (Energy Management System) and the like, it is often the case that weather report, which is acquired through networks, such as the Internet, is used to improve the accuracy of the prediction. However, for such a purpose, expenses, like a contract fee with a provider and an installation cost of a firewall, are required, and in addition, the composition of a system becomes complicated. In order to reduce these expenses, a technology to realize the prediction of an electric power demand even under an offline environment is proposed (refer to Patent Document 1).

In the technology in relation to the Patent Document 1, an air temperature is predicted from data which are in correlation with the temperature of the air, and a future electric power demand is predicted using the predicted air temperature.

CITATION LIST

Patent Literature

Patent Document 1: JP-2014-192910 A

SUMMARY OF THE INVENTION

Technical Problem

According to the method for predicting an electric power demand in relation to the Patent Document 1, there is a problem that operational treatment of prediction values for an air temperature is indispensable in the prediction of an electric power demand.

The present disclosure is made in order to solve those problems mentioned above, and aims at offering an electric power management station which is capable of conducting a demand prediction, even in a case where the prediction of an air temperature cannot be conducted under an off-line environment.

Solution to Problem

An electric power management station in relation to the present Embodiments, includes:
  an acquisition part, which acquires a classification setting information for deriving a classification result, by a date attribute information and an environment information which is measured with a measuring instrument on an inside of a prediction target area, and an actual performance information on electric power demand including an electric power demand, which is correlated with the environment information and the date attribute information,
  an actual performance information classify part, which derives a classification result of the actual information on electric power demand, by the classification setting information, from the environment information and the date attribute information which are correlated with each of the electric power demands included in the actual performance information on electric power demand, and in addition, correlates the derived classification result with each of the actual performance information on electric power demand, and
  a prediction information calculate part, which derives a classification result of a prediction target day, by the classification setting information, using the date attribute information of the prediction target day, which is a day to conduct a prediction, and the environment information which is measured before a start of the prediction of the prediction target day, and in addition, predicts an electric power demand of the prediction target day, based on the electric power demand of the actual performance information on electric power demand, which corresponds to the classification result of the prediction target day.

Advantageous Effects of Invention

According to the electric power management station in relation to the present disclosure, it becomes possible to predict a future electric power demand, even in a case where the prediction of an air temperature cannot be conducted under an offline environment.

BRIEF EXPLANATION OF DRAWINGS

FIG. 2 is a diagram for explaining the classification setting information in accordance with the Embodiment 1.

FIG. 3 is a diagram for explaining the actual performance information on electric power demand in accordance with the Embodiment 1.

FIG. 7 is a diagram for explaining the verification actual performance information in accordance with the Embodiment 2.

FIG. 10 is a diagram for explaining another example of the classification setting information in accordance with the Embodiment 3.

DESCRIPTION OF EMBODIMENTS

In the following Embodiments, explanation will be made about a case in which predictions about electric power demands are conducted every hour, of from 6:00 until 12 hours later (6:00 to 7:00, 7:00 to 8:00, - - - , 16:00 to 17:00, 17:00 to 18:00), where a prediction standard time (a time to start a prediction) is set at 6:00. However, these Embodiments are given as an example, and do not limit the scope of the present invention.

Embodiment 1

Figure 1:
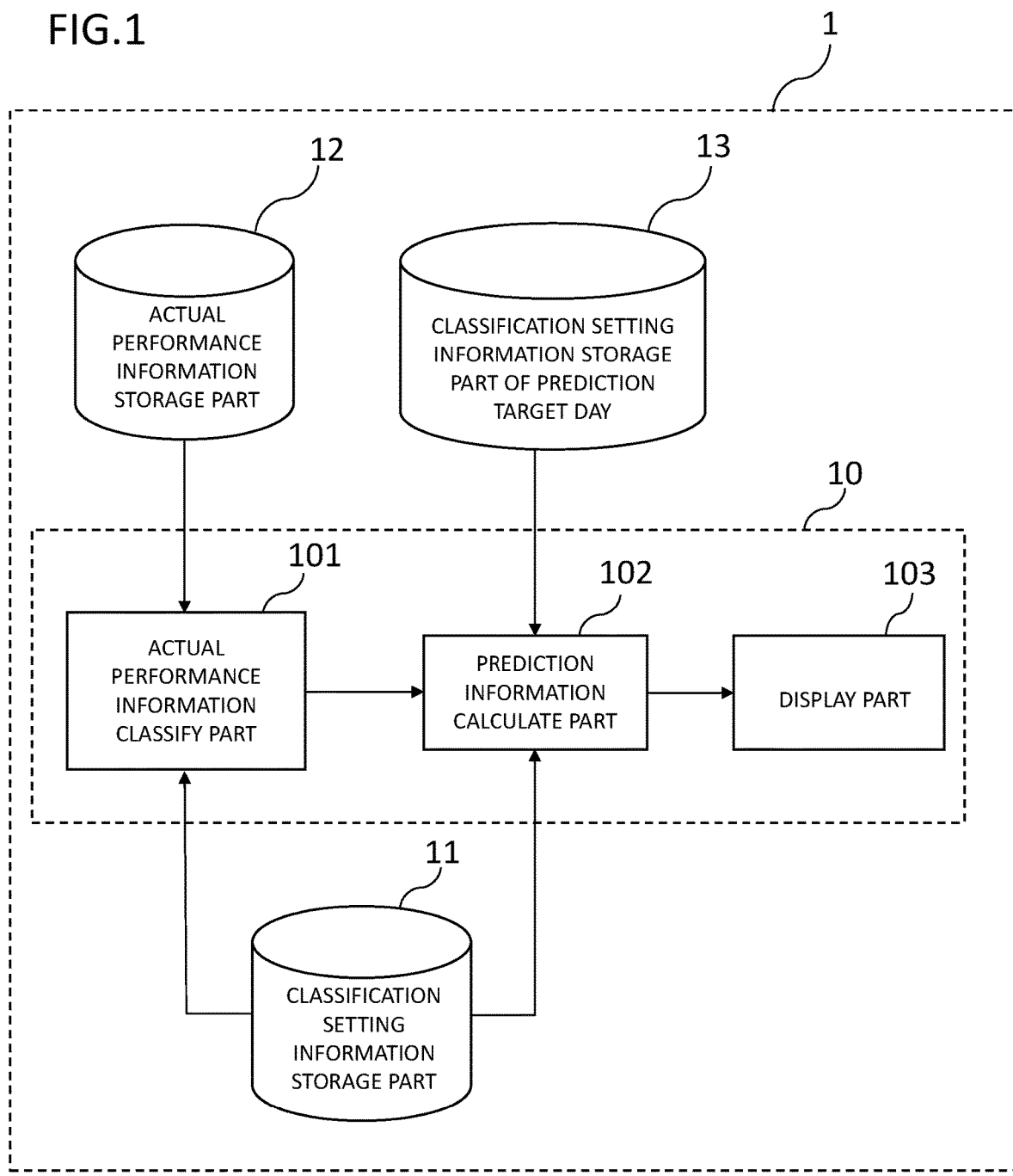
FIG. 1 is a configuration diagram of an electric power management system in accordance with Embodiment 1.

Hereafter, explanation will be made, using FIG. 1-FIG. 5, about the Embodiment 1. FIG. 1 is a configuration diagram of an electric power management system 1 according to the Embodiment 1. The electric power management system 1 is equipped with a storage part which stores various kinds of data, and an electric power management station 10 which conducts a demand prediction using the data stored in this storage part. As the storage part, there is provided with a classification setting information storage part 11 in which classification setting information is stored, an actual performance information storage part 12 in which actual performance information on electric power demand is stored, and a classification setting information storage part of prediction target day 13 in which the classification setting information on a day to conduct a prediction is stored. Further, the electric power management station 10 is equipped with an acquisition part (not shown in the drawing) which acquires information from the storage parts 11, 12, and 13.

It is to be noted that, in the following Embodiments, although the electric power management station 10 is configured to contain no storage parts mentioned above, the electric power management station is allowed to contain those storage parts.

The electric power management station 10 is equipped with an actual performance information classify part 101, a prediction information calculate part 102, and a display part 103.

The actual performance information classify part 101 correlates a past actual performance of electric power demand with a classification result. The prediction information calculate part 102 conduct the prediction of an electric power demand of a prediction target day, using a past electric power demand which is correlated with the classification result in the actual performance information classify part 101, and a classification result of a prediction target day, which is a day to conduct a prediction. The display part 103 displays the prediction value of the electric power demand calculated by the prediction information calculate part 102. It is to be noted that, although the electric power management station 10 in the electric power management system 1 is configured to include a display part 103, it is allowed that the display part 103 is configured to be provided on the outside of the electric power management system 1.

FIG. 2 is a diagram for explaining the classification setting information which is stored in the classification setting information storage part 11 according to the Embodiment 1.

The classification setting information includes information in relation to a date attribute category and an environment category. Further, with respect to the groups composed of a category result by the date attribute category and a category result by the environment category, the classification setting information includes information for correlating a classification result which corresponds to each of the groups.

For example, the classification setting information includes information in relation to a date attribute category and an environment category (air temperature). In the drawing, the date attribute category includes category conditions of "Weekday" and "Holiday," and the environment category (air temperature) includes category conditions of "Not less than 20° C." and "Less than 20° C." When "Weekday" and "Not less than 20° C." are the category results by the date attribute and by the environment category, respectively, "Pattern 1" is correlated, which is a classification result corresponding to the group, among groups of the category results by the date attribute and by the environment category.

In FIG. 2, the date attribute category is, for example, a category in relation to the date attribute, like "Weekday" or "Holiday." However, as far as information is for categorizing a date by the characteristics of respective days, the date attribute category will not be limited to the example mentioned above.

The environment category includes a category condition by the environment information, for example, a temperature measured and others. In FIG. 2, one category value ("20° C.") is set up in the environment category, and this category value is used to categorize the category condition into "Not less than 20° C." and "Less than 20° C." However, a plurality of category values can be provided. That is, it is allowed to set up a plurality of category values (for example, "10° C." and "20° C."), and to categorize the category condition into, such as, "Less than 10° C." "Not less than 10° C., and less than 20° C." and "Not less than 20° C."

For more detail, although the environment information according to the present Embodiments is a temperature measured, the environment information can be an air temperature, a humidity, an atmospheric pressure, a wind velocity, a wind direction, an amount of rain fall, and the like. Here, the temperature measured is the one which is acquired at a pre-determined time (prediction standard time), by a measuring instrument, such as a thermometer and a hygrometer, which is installed at a prediction target point.

It is to be noted that, although the display style (FIG. 2) of the classification setting information according to the present example is a tabular form, the display style of this classification setting information is an example, and the display style is not limited to the example mentioned above.

FIG. 3 is a diagram for explaining an example of the actual performance information on electric power demand, which is stored in the actual performance information storage part 12 according to the Embodiment 1. In FIG. 3, the first row is a date (Format in yyyyMMdd), and 20170101 of the first row on the first line means Jan. 1, 2017. The second row shows a date attribute category result. The third row shows an air temperature measured, as environment information, which is the one measured at a prediction standard time (Format in hh:mm:06:00 indicates 6:00 a.m.). The fourth row shows a humidity which is measured at a prediction standard time. The fifth row to the last row (17th row) show an actual electric power demand [kWh] of every hour and of on and after 06:00.

Specifically, the first line (20170101) of the actual performance information on electric power demand is took up as an example. The date attribute category result fits in "Weekday" and the environment category result fits in "Not less than 20° C." The first line is classified in Pattern 1, which corresponds to the group of an environment category result ("Not less than 20° C.") and a date attribute category result ("Weekday"). Further, regarding the second line (20170102), the date attribute category result corresponds to a condition of "Holiday," and the environment category result for the air temperature corresponds to a condition of "Less than 20° C." As a result, a classification result of "Pattern 4" can be derived, by using the classification setting information.

It is to be noted that, the air temperature as the environment information, according to the present Embodiment, is an actual performance on the air temperature, which is observed with a thermometer installed on the inside of a prediction target point or a prediction target area. This actual performance on the air temperature is a value which is measured at a time prior to a prediction standard time. Although any time is available as the measurement time of the environment information, as long as it is the time prior to the prediction standard time, it is desirable that the measurement time is a time close to the prediction standard time. In the present example, the prediction standard time is set to 06:00, and the measurement time of an actual performance on the air temperature is, for example, set to 05:55. This measurement time corresponds to a time, five minutes prior to the prediction standard time.

Figure 4:
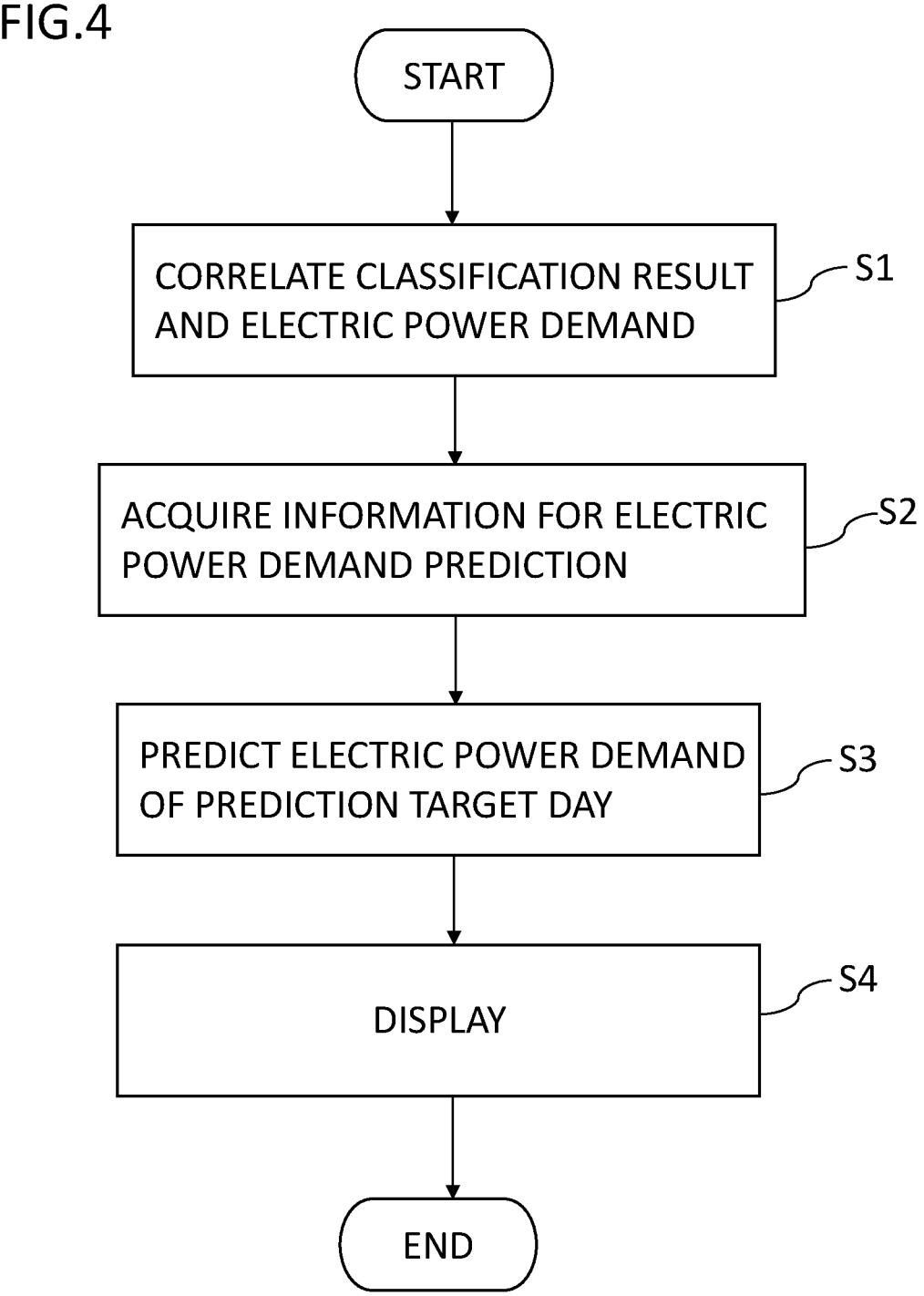
FIG. 4 is a flow chart of the electric power management station in accordance with the Embodiment 1.

FIG. 4 is a flow chart diagram showing an example of the operation in the electric power management station 10 according to the present Embodiments. It is to be noted that, as for the timing to start a prediction in FIG. 4, the process starts automatically at a timing in an arbitrary time zone (for example, 6:00 a.m.) or at a time interval (for example, every other day, or every other month), which a user or the like sets up in advance. Or, when a user inputs a signal into an input device (FIG. 5), such as a keyboard, the process starts at an arbitrary timing.

When predictions start in the electric power management station 10, the actual performance information classify part 101, using an actual performance on electric power demand (stored in the actual performance information storage part 12) and a classification setting information (stored in the classification setting information storage part 11), correlates a classification result with an electric power demand (Step S1).

For more detail, the actual performance information classify part 101 derives a classification result, using the classification setting information, from the environment information and the date attribute information which are correlated with each of the electric power demands, included in the actual performance information on electric power demand. And in addition, the actual performance information classify part correlates this derived classification result, with each actual performance information on electric power demand.

In the following step, the prediction information calculate part 102 acquires information which is necessary for the prediction of an electric power demand of a prediction target day (Step S2). For more detail, the prediction information calculate part 102 acquires the environment information and date attribute information of a prediction target day, from the classification setting information storage part of prediction target day 13. Moreover, the prediction information calculate part 102 acquires the classification setting information from the classification setting information storage part 11.

The prediction information calculate part 102 predicts the electric power demand of the prediction target day, using the input information (the classification setting information and the classification information of a prediction target day) and the outputs (the actual performance information on electric power demand which is correlated with a classification result) from the actual performance information classify part 101 (Step S3).

For more detail, the prediction information calculate part 102 derives the classification result which corresponds to the date attribute information and environment information of a prediction target day, by using the classification setting information. Furthermore, the prediction information calculate part 102 predicts the electric power demand of a prediction target day, based on the electric power demand of the actual performance information on electric power demand, which is correlated with the classification result of a prediction target day.

In the following step, the display part 103 displays the value of the electric power demand which is predicted by the prediction information calculate part 102 (Step S4).

Figure 5:
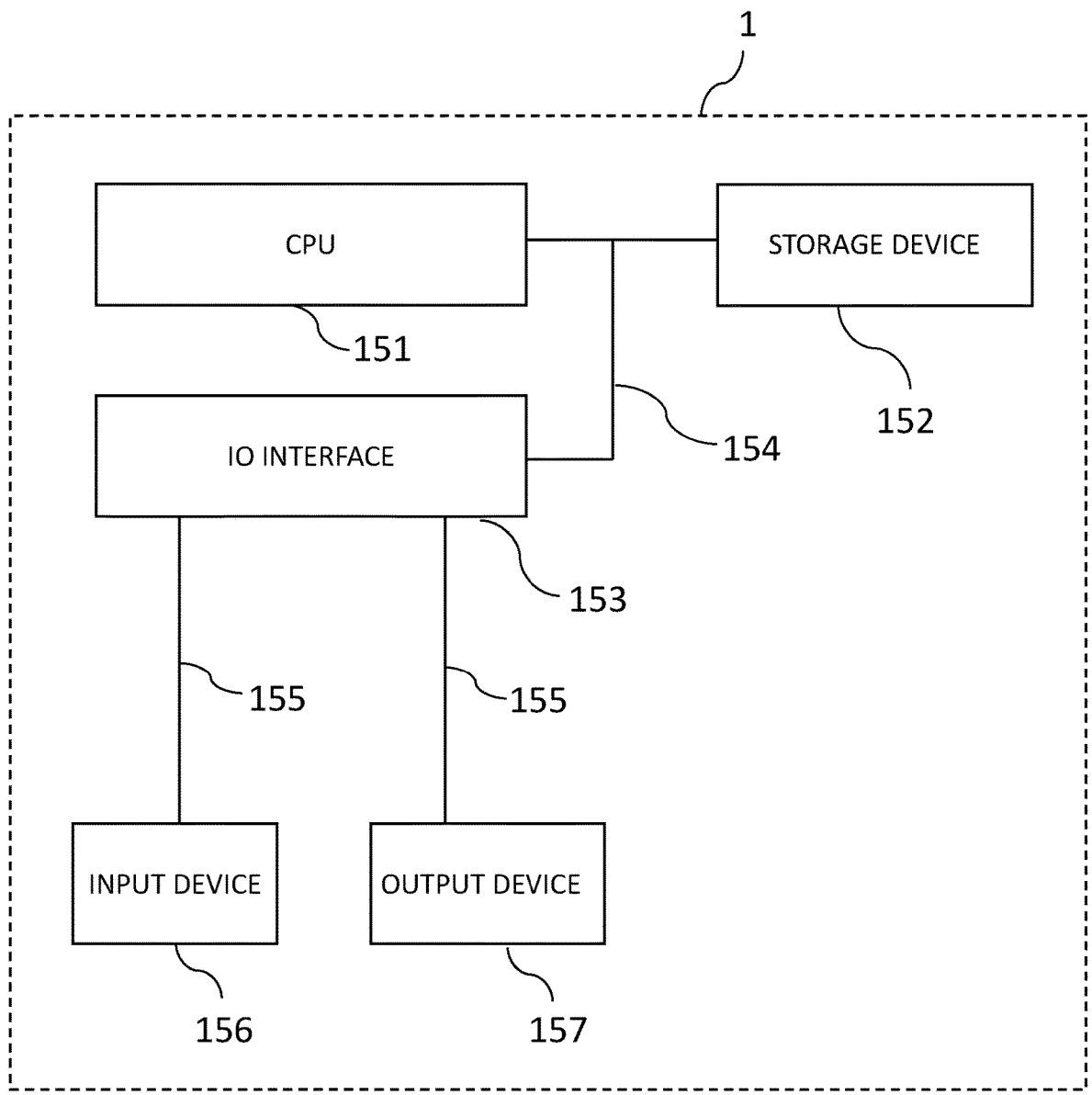
FIG. 5 is a hardware configuration diagram which realizes the electric power management station in accordance with the Embodiment 1.

FIG. 5 is a hardware configuration diagram for realizing the electric power management system 1 according to the Embodiment 1. Specifically, the electric power management system 1 is, in whole or in part, equipped with a CPU 151 (Central Processing Unit), a storage device 152, an IO (INPUT OUTPUT Input and Output) interface 153, and a system bus 154. The storage device 152 consists of a ROM (Read Only Memory), a HDD (Hard Disk Drive), and the like. Further, the electric power management system 1 is allowed to be provided further with an input-output device (an input device 156 and an output device 157), which is connected to the system through the cable 155.

The classification setting information storage part 11, the actual performance information storage part 12, and the classification setting information storage part of prediction target day 13 correspond to the storage device 152. The actual performance information classify part 101 and the prediction information calculate part 102 correspond to the CPU 151. Moreover, acquisition parts (acquires information from the various storage parts 11, 12, and 13) correspond to the IO interface 153. The display part 103 corresponds to the output device 157.

If the above-mentioned information which is used on an electric power demand prediction is changed, the information can be applied also to an electric power produced amount prediction on renewable energy by photovoltaics and the like. It is because the electric power demand prediction and the electric power produced amount prediction are fundamentally the same in processing, except that those predictions use different information.

Here, with respect to the information used for the electric power produced amount prediction, explanation will be made below about the difference with the information used for the electric power demand prediction. The difference with the electric power demand prediction is the classification setting information of a classification setting information storage part 11 and the information which is saved in an actual performance information storage part 12. First, an actual performance information on electric power production, which is the actual performance of an electric power produced amount, is stored in the actual performance information storage part 12, instead of the actual performance information on electric power demand. Next, the classification setting information which is used for an electric power produced amount prediction includes the environment category about mutually different and plural kinds of environment information. Specifically, the classification setting information has a classification category targeted for an air temperature, and in addition, includes the environment category targeted for at least one of a humidity, an atmospheric pressure, a wind velocity, a wind direction, and an amount of rain fall.

That is to say, the environment information targeted in the environment category is values which are actually measured on the inside of a prediction target area, including a temperature and at least one of a humidity, an atmospheric pressure, a wind velocity, a wind direction, and an amount of rain fall. For example, an air temperature and an amount of rain fall are selected for the environment information which is targeted in the environment category, and an environment category is set to each of the air temperature and the amount of rain fall.

It is to be noted that, also in the following Embodiments, like in the present Embodiment, when information to be used is changed as mentioned above, the information is applicable to the electric power demand prediction of regenerative energy, instead of the electric power produced amount prediction.

In the conventional electric power produced amount prediction of renewable energy, there is a problem that operational treatment to obtain prediction values for the air temperature is indispensable by the configuration mentioned above. However, it becomes possible to conduct an electric power produced amount prediction, by the electric power management station 10, which has the constitution mentioned above, even when the prediction of an air temperature is not performed under an offline environment.

As mentioned above, the electric power management station 10 and the electric power management system 1 according to the present Embodiment predict an electric power demand at a post-prediction standard time, based on the past electric power demand, which is similar in the prediction target date and hour, the date attribute information, and the environment information. Thereby, even though the prediction for an air temperature is unnecessary in an offline environment, the prediction of an electric power demand can be conducted.

The electric power management station 10 and the electric power management system 1 according to the present Embodiment predict also an electric power produced amount at a post-prediction standard time, based on the past actual performance on electric power production of renewable energy, which is similar in the prediction target date and hour, the date attribute information, and the environment information. Thereby, even though the prediction of an air temperature is unnecessary in an offline environment, the electric power produced amount prediction can be conducted.

Embodiment 2

Figure 6:
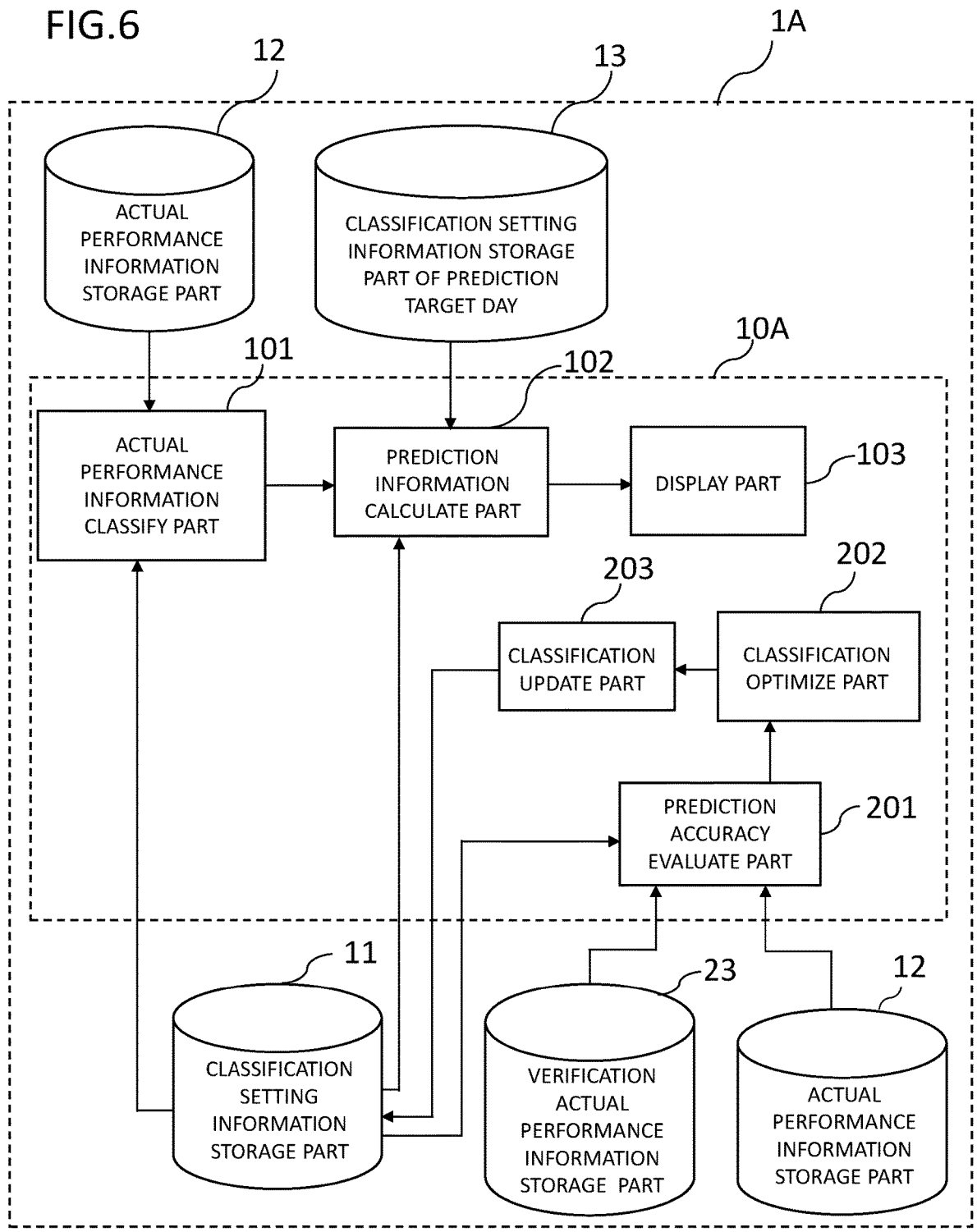
FIG. 6 is a configuration diagram of an electric power management system in accordance with Embodiment 2.

FIG. 6 is a configuration diagram for showing an electric power management system LA according to the Embodiment 2. The electric power management system 1A is equipped with an electric power management station 10A, instead of the electric power management station 10. Moreover, the electric power management system 1A is further equipped with a verification actual performance information storage part 23.

The electric power management station 10A differs from the electric power management system according to the Embodiment 1, in that the electric power management station 10A is further equipped with a prediction accuracy evaluate part 201, a classification optimize part 202, and a classification update part 203. In FIG. 6, components which are given the same symbol as in FIG. 1 are the ones which are identical with or corresponding to those in FIG. 1, and detailed explanation about those components will not be repeated.

Before explaining the details of the prediction accuracy evaluate part 201 and the classification update part 203, verification actual performance information of the verification actual performance information storage part 23 is explained. FIG. 7 shows an example of the diagram for explaining the verification actual performance information. As shown in FIG. 7, the verification actual performance information differs from the actual performance information on electric power demand, in the time of acquisition, such as "Acquisition year" and "Acquisition month." Other than the fact that the time of acquisition is different, the verification actual performance information is the same as the actual performance information on electric power demand, and includes the information about the electric power demand of each date, which is correlated with the environment information and the date attribute information. In the drawing, while the acquisition year of the actual performance information on electric power demand is the year 2017, the acquisition year of the verification actual performance information is the year 2018.

Figure 8:
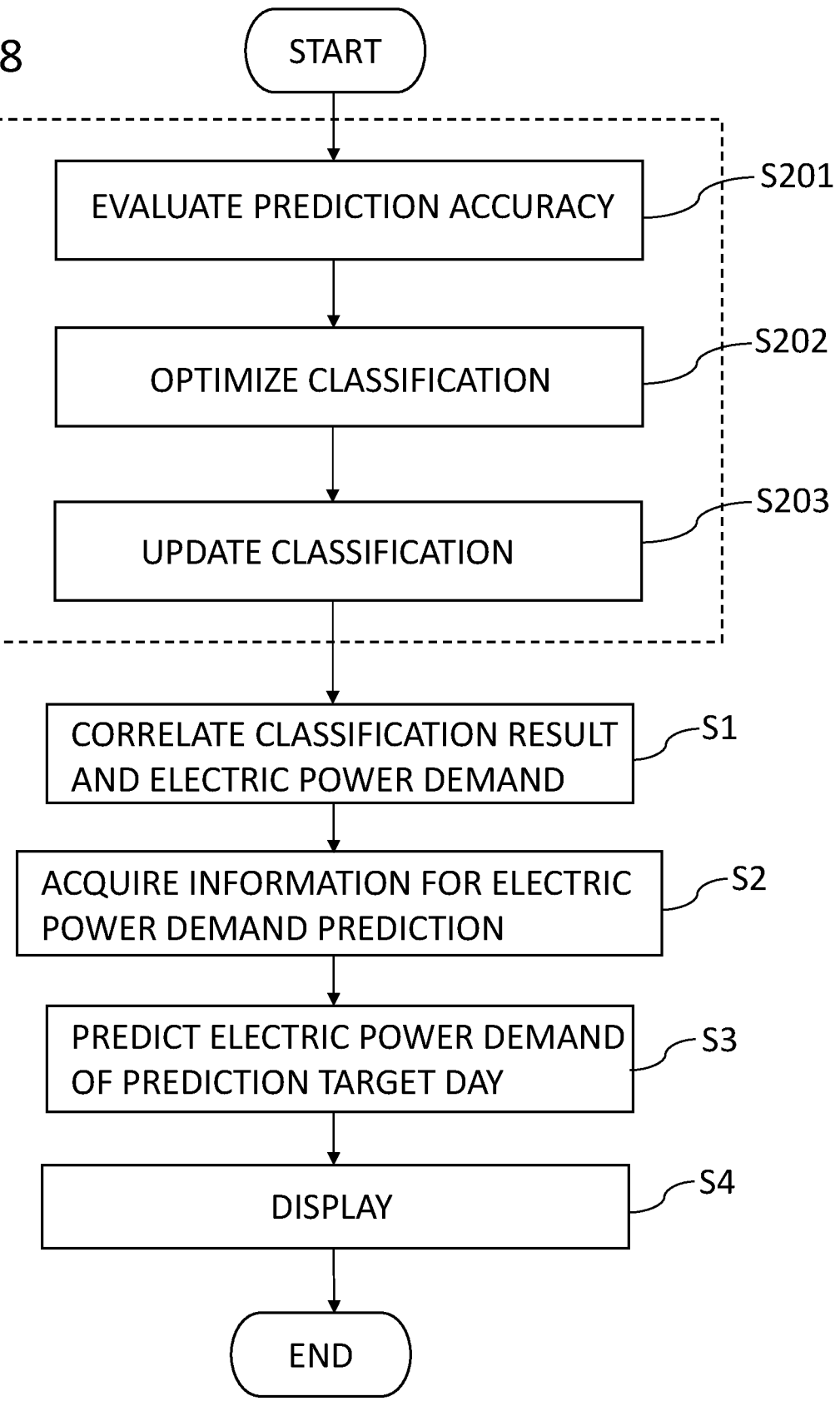
FIG. 8 is a flow chart of the electric power management station in accordance with Embodiment 3.

FIG. 8 is a flow chart diagram for showing an example of the operations of the electric power management station 10A according to the Embodiment 2. In the drawing, with regard to a step common with or corresponding to the one in the flow chart diagram of FIG. 4, the same symbol is given, and detailed explanation about those steps is likely to be omitted.

The prediction accuracy evaluate part 201 evaluates a prediction accuracy (prediction error), by using the verification actual performance information (Step S201). For more detail, the prediction accuracy evaluate part 201 calculates the prediction value of an electric power demand, regarding respective days which are included in the verification actual performance information, using the classification setting information and the actual performance information on electric power demand, like the prediction information calculate part 102. The prediction accuracy evaluate part 201 calculates a prediction accuracy (prediction error), based on the difference between the actual performance value and the prediction value of the electric power demand, which are included in the verification actual performance information.

In the following step, a new classification setting information, which can realize the improvement in the accuracy of demand prediction, is calculated in the classification optimize part 202, by conducting an optimized calculation which will be described below (Step S202). The classification optimize part 202 derives a classification setting information including an environment category, which will produce an improved prediction accuracy.

The classification update part 203 saves, in the classification setting information storage part 11, the classification setting information which is derived by the classification optimize part 202, as a post-update classification setting information. (Step S203).

After that, the post-update classification setting information is used to conduct Step S1 to Step S4. The actual performance information classify part 101 and the prediction information calculate part 102 conduct processes which are explained in the Embodiment 1 (namely, processes of Step S1 to Step S4 of FIG. 4), using the post-update classification setting information, which is saved in the classification setting information storage part 11.

Here, explanation will be made in detail below about the method of evaluating the prediction accuracy in Step S201. The first line of the table of the verification actual performance information, which is shown in FIG. 7, is 20180101, and a case will be explained where this day is selected as a prediction target day, and a prediction accuracy is evaluated. Regarding that day, the date attribute category corresponds to a condition "Holiday," and the environment category corresponds to a condition "The air temperature is less than 20° C." Thereby, according to the classification setting information of FIG. 2, the classification result becomes "Pattern 4" (in the following, the result can be referred to as "Classification result (Pattern 4)"). It is to be noted that, the prediction accuracy evaluate part 201 calculates the prediction value of an electric power demand, according to the explanation made below. However, it is allowed that the prediction information calculate part 102 conducts the calculation of this prediction value.

For example, the prediction accuracy evaluate part 201 averages, according to a time zone, regarding the electric power demand of the actual performance information on electric power demand, which is classified in the Classification result (Pattern 4). The averaged result is calculated as a prediction value Predict (date, time). Here, the date shows a date index showing a period from 20180101 to 20181231. Furthermore, the time shows a time index, and time= 1, 2, - - - , 11 and 12 correspond to clock time 6:00, 7:00 - - - , 16:00, and 17:00, respectively.

The prediction accuracy evaluate part 201 calculates a prediction accuracy (prediction error) Accuracy (date), which is shown in the Expression 1, using the before mentioned prediction value Predict and the actual performance value Result (date, time) of the electric power demand in the verification actual performance information (FIG. 7). In this regard, |A| means to take an absolute value with respect to A, in the Expression 1.

$$\text{Accuracy(date)} = \sum_{time} |\text{Predict(date, time)} - \text{Result(date, time)}| \qquad [\text{Expression 1}]$$

The prediction accuracy evaluate part 201 calculates a prediction error by the Expression 1, regarding respective lines of the verification actual performance information. The prediction accuracy evaluate part 201 totals the calculated prediction accuracies (prediction errors) according to the Expression 2, and calculates as an Accuracy. The Accuracy is also referred to as a total prediction error, that is to say, it is a calculated value, based on the difference between the prediction value of the electric power demand which is calculated using the classification setting information and the actual performance information on electric power demand, and the actual performance value of the day corresponding to this prediction value (verification actual performance information). It is to be noted that, the prediction error can accept both of a prediction error for one day which is shown by the before mentioned Expression 1, and a total prediction error for a plurality of days which is shown in the Expression 2.

$$\text{Accuracy} = \sum_{date} \text{Accuracy(date)} \qquad [\text{Expression 2}]$$

Explanation will be made below about an example of the method for optimizing the classification setting information, which is conducted in the classification optimize part 202. First, the environment category (air temperature) in the classification setting information is expressed as a variable x, like "Not less than x° C." and "Less than x° C." Further, a total prediction accuracy Accuracy is expressed, using this variable x. The Accuracy, which is the total prediction accuracy (prediction error), is chosen as an objective function, and the solution to an optimization problem is derived. This derived solution is defined as x', and the category conditions of the environment category are updated to "Not less than x'° C." and "Less than x'° C."

As the method of deriving a solution (x') for setting up the category condition of the above mentioned environment category, optimization techniques, such as particle swarm optimization and genetic algorithm, are used as an example. Specifically, the prediction accuracy Accuracy is chosen as an objective function. In these optimization techniques, a solution (x') is derived, where the objective function based on this prediction accuracy becomes a minimum value or a value below a pre-determined value.

As mentioned above, in the electric power management station according to the present Embodiment, a prediction error is calculated based on the difference between the prediction value and the actual performance value of an electric power demand. Since the classification setting information is updated so that this calculated prediction error may become small, the prediction of an electric power demand can be attained in a high precision level. Moreover, a prediction error is calculated based on the difference between the prediction value and the actual performance value of an electric power produced amount. Since the classification setting information is updated so that this calculated prediction error may become small, the electric power produced amount prediction can be attained in a high precision level.

Embodiment 3

Figure 9:
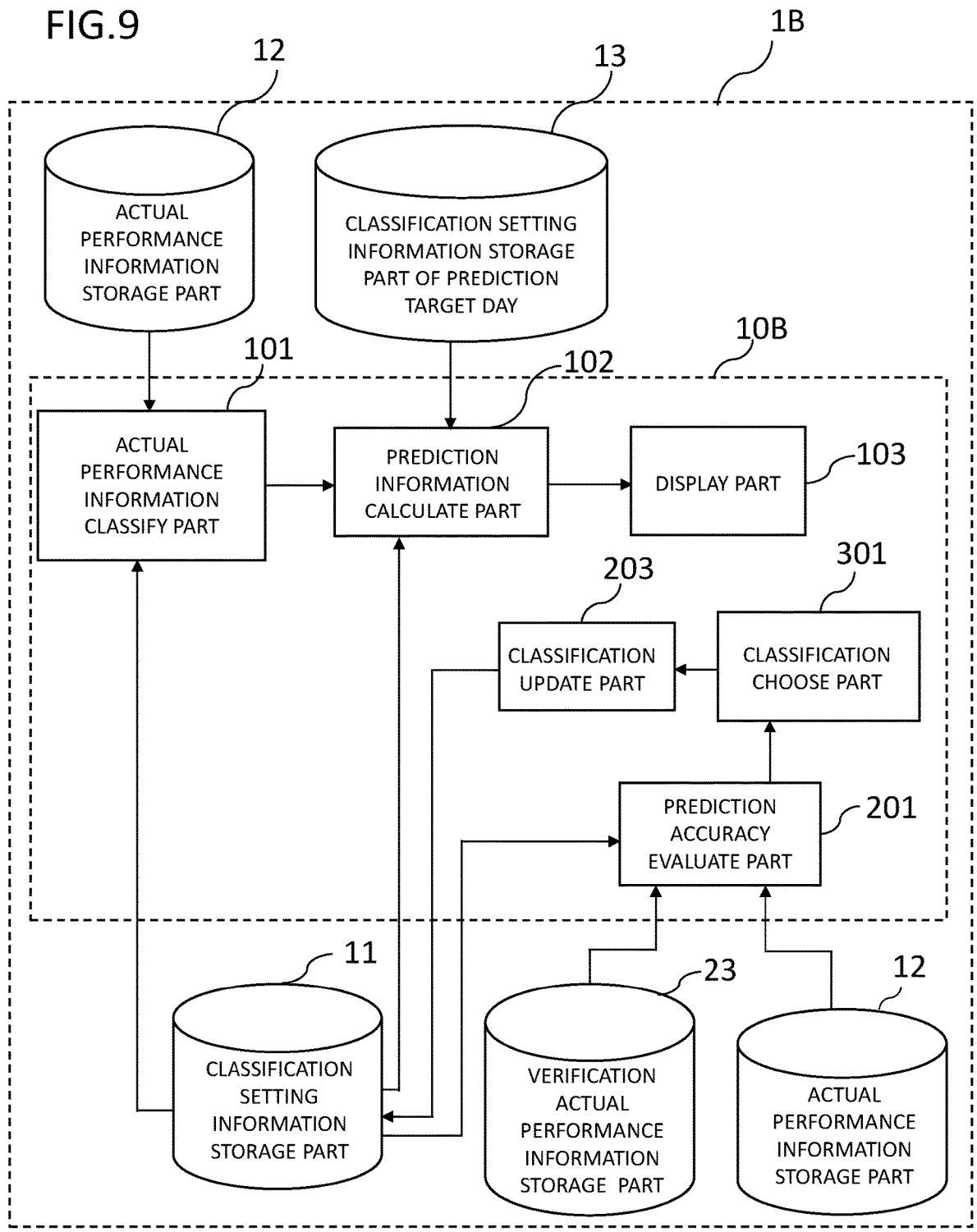
FIG. 9 is a diagram for explaining an electric power management system in accordance with the Embodiment 3.

FIG. 9 is a diagram for explaining the Embodiment 3. The electric power management system 1B is equipped with an electric power management station 10B, instead of the electric power management station 10A. The electric power management station 10B differs from the before mentioned Embodiments, in that the electric power management station 10B is equipped with a classification choose part 301 which chooses an item of the classification setting information, so that the prediction accuracy may be improved, instead of the classification optimize part 202 of the electric power management station 10A. In FIG. 9, components which are given the same symbol as in FIG. 6 are the ones which are identical with or corresponding to those in FIG. 6, and explanation about these components will not be repeated.

FIG. 10 shows an example of the classification setting information, in a case where humidity is considered as an environment category. For example, in a case where the humidity is 75% and the target day is a holiday, the environment category (humidity) fits in "Not less than 50%" and the date attribute information fits in "Holiday." Thereby, the classification result becomes "Pattern 2."

In each of the multiple classification setting information, for categorizing the environment information (for example, an air temperature and a humidity), which are of mutually different kinds, the classification choose part 301 chooses at least one of the multiple classification setting information, as a classification setting information, based on the prediction error which is calculated by the prediction accuracy evaluate part 201.

Specifically, the classification choose part 301 compares a prediction error which is obtained when the classification setting information by an environment category, targeting the environment information focused on an air temperature is used, with a prediction error which is obtained when the classification setting information by an environment category, targeting the environment information focused on a humidity. And the classification choose part 301 chooses a classification setting information with a smaller prediction error.

When the classification choose part 301 chooses the classification setting information of an environment category targeting an air temperature, the classification setting information becomes FIG. 2, and when the classification choose part 301 chooses the classification setting information of an environment category targeting a humidity, the classification setting information becomes FIG. 10.

It is to be noted that, although the present Embodiment shows an example case in which an air temperature and a humidity are compared, it is possible to use other weather bulletins (an atmospheric pressure, a wind velocity, a wind direction, an amount of rain fall, and others).

As mentioned above, according to the electric power management station according to the present Embodiment, environment categories of plural kinds are used, by the constitution mentioned above. Since a classification setting information with a smaller prediction error is used as the classification setting information, it becomes possible to conduct an electric power demand prediction or an electric power produced amount prediction in a higher precision level.

As mentioned above, explanation is made about electric power management stations and electric power management systems according to the Embodiments 1 to 3, which are explained in the before mentioned Embodiments. It is obvious that an electric power management station and an electric power management system can be constructed, by combining suitably a part of or all of the compositions of these Embodiments.

EXPLANATION OF NUMERALS AND SYMBOLS 10, 10A, and 10B Electric power management station;
11 Classification setting information storage part;
12 Actual performance information storage part;
13 Classification setting information storage part of prediction target day;
101 Actual performance information classify part;
102 Prediction information calculate part;
103 Display part;
201 Prediction accuracy evaluate part;
202 Classification optimize part;
203 Classification update part;
301 Classification choose part.

What is claimed is:

1. An electric power management station, comprising:
a processor to execute a program,
a memory to store the program which, when executed by the processor, performs processes of,
acquiring a classification setting information for deriving a classification result, by a date attribute information and an environment information which is measured with a measuring instrument on an inside of a prediction target area, and an actual performance information on electric power demand including an electric power demand, which is correlated with the environment information and the date attribute information,
deriving a classification result of the actual information on electric power demand, by the classification setting information, from the environment information and the date attribute information which are correlated with each of the electric power demands included in the actual performance information on electric power demand, and in addition, correlates the derived classification result with each of the actual performance information on electric power demand,
deriving a classification result of a prediction target day, by the classification setting information, using the date attribute information of the prediction target day, which is a day to conduct a prediction, and the environment information which is measured before a start of the prediction of the prediction target day, and in addition, predicts an electric power demand of the prediction target day, based on the electric power demand of the actual performance information on electric power demand, which corresponds to the classification result of the prediction target day, and
evaluating a prediction error of a prediction value with respect to an actual performance value, based on a difference between a prediction value of the electric power demand which is calculated using the actual performance information on electric power demand, and an actual performance value of the electric power demand in a verification actual performance information with a date which corresponds to the prediction value.

2. The electric power management station according to claim 1, wherein the environment information includes at least one of an air temperature or a humidity.

3. The electric power management station according to claim 2, further comprising:
processes of setting up an environment category for categorizing the environment information in the classification setting information, as a post-update classification setting information, so that the prediction error becomes minimum, or becomes smaller than a pre-determined value, and
updating the post-update classification setting information as a classification setting information.

4. The electric power management station according to claim 3, further comprising,
processes of calculating each of the prediction errors, in a case where multiple classification setting information including the environment information of mutually different kinds are used, and
choosing at least one of the multiple classification setting information as the classification setting information, based on the magnitude of the prediction errors, which are calculated from each of the multiple classification setting information.

5. The electric power management station according to claim 4, comprising a display, which displays an electric power demand of a prediction target day.

6. The electric power management station according to claim 3, comprising a display, which displays an electric power demand of a prediction target day.

7. The electric power management station according to claim 2, further comprising,
processes of calculating each of the prediction errors, in a case where multiple classification setting information including the environment information of mutually different kinds are used, and
choosing at least one of the multiple classification setting information as the classification setting information, based on the magnitude of the prediction errors, which are calculated from each of the multiple classification setting information.

8. The electric power management station according to claim 7, comprising a display, which displays an electric power demand of a prediction target day.

9. The electric power management station according to claim 2, comprising a display, which displays an electric power demand of a prediction target day.

10. The electric power management station according to claim 1, further comprising:
processes of setting up an environment category for categorizing the environment information in the classification setting information, as a post-update classification setting information, so that the prediction error becomes minimum, or becomes smaller than a predetermined value, and updating the post-update classification setting information as a classification setting information.

11. The electric power management station according to claim 10, further comprising, processes of calculating each of the prediction errors, in a case where multiple classification setting information including the environment information of mutually different kinds are used, and choosing at least one of the multiple classification setting information as the classification setting information, based on the magnitude of the prediction errors, which are calculated from each of the multiple classification setting information.

12. The electric power management station according to claim 11, comprising a display, which displays an electric power demand of a prediction target day.

13. The electric power management station according to claim 10, comprising a display, which displays an electric power demand of a prediction target day.

14. The electric power management station according to claim 1, further comprising, processes of calculating each of the prediction errors, in a case where multiple classification setting information including the environment information of mutually different kinds are used, and choosing at least one of the multiple classification setting information as the classification setting information, based on the magnitude of the prediction errors, which are calculated from each of the multiple classification setting information.

15. The electric power management station according to claim 14, comprising a display, which displays an electric power demand of a prediction target day.

16. The electric power management station according to claim 1, comprising a display, which displays an electric power demand of a prediction target day.

17. An electric power management station, comprising:
a processor to execute a program,
a memory to store the program which, when executed by the processor, performs processes of, acquiring a classification setting information for deriving a classification result, by a date attribute information and an environment information which is measured actually on an inside of a prediction target area, including a temperature and at least one of a humidity, an atmospheric pressure, a wind velocity, a wind direction, and an amount of rain fall, and an actual performance information on electric power production, which is a past actual performance on electric power production of regenerative energy, where the actual performance information is correlated with the environment information and the date attribute information, deriving classification result of the actual performance information on electric power production, by the classification setting information, from the environment information and the date attribute information which are correlated with each of the actual performances on electric power production, included in the actual performance information on electric power production, and correlates the derived classification result with each of the actual performance information on electric power production, deriving a classification result of a prediction target day, by the classification setting information, using a date attribute information of the prediction target day which is a day to conduct a predict, and an environment information which is measured before a start of a prediction of the prediction target day, and in addition, predicts an actual performance on electric power production of the prediction target day, based on the actual performance on electric power production of the actual performance information on electric power production, which corresponds to the classification result of the prediction target day, and evaluating a prediction error of a prediction value with respect to an actual performance value, based on a difference between a prediction value of the electric power demand which is calculated using the actual performance information on electric power demand, and an actual performance value of the electric power demand in a verification actual performance information with a date which corresponds to the prediction value.

* * * * *